United States Patent
Lai

(10) Patent No.: US 7,957,640 B2
(45) Date of Patent: Jun. 7, 2011

(54) POSITIONING DEVICE FOR A REFERENCE SURFACE

(75) Inventor: Yuk Shing Lai, Homantin (HK)

(73) Assignee: Nauticam International Limited, Fo Tan (HK)

( * ) Notice: Subject to any disclaimer, the term of this patent is extended or adjusted under 35 U.S.C. 154(b) by 0 days.

(21) Appl. No.: 12/576,535

(22) Filed: Oct. 9, 2009

(65) Prior Publication Data

US 2010/0232780 A1    Sep. 16, 2010

Related U.S. Application Data

(60) Provisional application No. 61/103,987, filed on Oct. 9, 2008.

(51) Int. Cl.
*G03B 17/08* (2006.01)
*G03B 11/00* (2006.01)

(52) U.S. Cl. .......................................... 396/544; 396/25
(58) Field of Classification Search .................. 396/544, 396/25

See application file for complete search history.

(56) References Cited

U.S. PATENT DOCUMENTS

| 5,438,363 | A  | * | 8/1995 | Ejima et al. | 348/223.1 |
| 2006/0176379 | A1 | * | 8/2006 | Hyodo | 348/223.1 |
| 2008/0012959 | A1 | * | 1/2008 | Park | 348/223.1 |

FOREIGN PATENT DOCUMENTS

| EP | 0 340 683 | 9/2000 |
| EP | 1 591 828 | 11/2005 |
| JP | 09-197529 | 7/1997 |
| JP | 2000-244806 | 9/2000 |

* cited by examiner

*Primary Examiner* — Rodney E Fuller
(74) *Attorney, Agent, or Firm* — Young & Thompson

(57) ABSTRACT

A positioning device for a reference surface within a lens port having a longitudinal axis, where a reference surface element able to be extended substantially transversely across the port and withdrawn from the extended position are provided. A transverse movement element to effect such extension and withdrawal of the reference surface are provided and the transverse movement element is operable from a position external of the lens port. The device further includes a camera or camera housing with a reference element of this type associated therewith. The invention finds particular use in the field of underwater photography.

17 Claims, 23 Drawing Sheets

POSITIONING DEVICE FOR A REFERENCE SURFACE

The invention relates to a Positioning Device for a Reference Surface and/or a Camera and/or a camera in an underwater camera housing. The positioning device particularly, though not necessarily solely is a reference surface for a lens port as may be used in underwater photography.

BACKGROUND OF INVENTION

In underwater photography, the use of a water-proof cylindrical port is necessary to accommodate the lens of a still camera. A port can be attached directly to the water-proof housing or to an extension ring before attachment to the housing, depending on the length of the lens. Very often, manufacturers specify which lenses a particular port is suitable for.

The refractive property of the water leads to edge distortions of images, this effect is especially significant when using wide angle lenses and fish-eye lenses. A dome-shaped port can be used to eliminate or at least reduce the distortions.

On the other hand, the effects of refraction are desirable when using a standard or a macro lens; these include the reduction of the angle-of-view and the increase of the magnification of the lens. Therefore, a flat port is normally used when shooting small objects underwater.

Different light sources have different spectral properties, meaning that they emit light at different colour temperatures. A light source which has a low colour temperature implies the light it emits is shifted towards the warmer end, giving the image a red/orange cast; on the contrary, a high colour temperature implies the light is shifted towards the colder end, giving the image a blue cast.

It is therefore of significant importance for a photographer to take this phenomenon into account in order to produce colour-balanced, natural-looking images.

Most digital cameras have an auto white balance function and some preset white balance settings, such as tungsten, fluorescent, cloudy, and sunny, however, these are not always consistent and accurate as they are not based on the exact colour temperature at the instant of shooting. Therefore, many cameras have a built-in custom white balance function which allows the photographer to calibrate the white balance according to the lighting environment at that moment.

One method of achieving an accurate white balance requires the photographer to take a photo of a calibration target, which has to be a white or grey object; the camera then uses this as a reference to set the white balance. At present, white and grey cards are available in the market for this purpose. Alternatively, a translucent white filter can be placed in front of the lens and by capturing the incident light; the correct white balance can be obtained.

White balance has to be re-set when the lighting environment changes, this implies the photographer has to look for a white/grey object, use the white/grey cards, or attach then detach a translucent white filter every time the lighting situation changes, which when shooting on land, can be done relatively easily.

In underwater photography, achieving an accurate white balance is considerably important, as a result of the ability of the water to absorb light of long wavelengths, such as the red and orange, causing objects to appear blue-green. The effect becomes more significant with increasing water depths. This demands that the photographer frequently calibrates the white balance underwater at varying depths.

Similar methods as the ones mentioned above for shooting on land can be adopted for customising white balance underwater; however, the utilisation of a port leads to the impossibility of repeatedly putting on and taking off the calibration device from the lens. Hence, the calibration device has to be attached outside the port and taken off after the white balance is set. Instead, an underwater photographer can make use of white/grey cards; both methods imply the need for the photographer to carry extra objects underwater, this not only inconvenient but also increases the water resistance of the photographer. Some underwater photographers therefore choose to make use of white or grey objects underwater as calibration targets, but again, this method cannot guarantee accurate white balance settings.

Thus it can be seen that setting white balance while underwater presents considerable difficulty.

OBJECT OF THE INVENTION

It is therefore an object of the invention to provide a positioning device for a reference surface and/or a camera and/or a camera in an underwater camera housing that ameliorates some of the difficulties and limitations of the known art or which will at least provide the public with a useful choice.

SUMMARY OF INVENTION

In a first aspect the invention resides in a positioning device for a reference surface within a lens port having a longitudinal axis, comprising reference surface means able to be extended substantially transversely across said port and withdrawn from the extended position; transverse movement means to effect such extension and withdrawal of the reference surface, the transverse movement means being operable from a position external of the lens port.

Preferably the positioning device further includes translational movement means to move the reference surface in a direction substantially parallel to the longitudinal axis, the translational movement means being operable from a position external of the lens port.

Preferably, the reference surface comprises or includes a reference to allow the white balance of a photographic device to be set.

Preferably the transverse movement means and the translational movement means are able to be operated by a single control member positioned external of the lens port.

Preferably the reference surface comprises a plurality of pivotally mounted blades, the blades being rotatable about the pivot point so as to be extendable or retractable transversely of the longitudinal axis.

Preferably the blades are mounted in a first ring member, the ring member being movable to effect translational movement of the reference surface.

Preferably a second ring member is provided within the port, and the control member includes a shaft passing through the port, and operation of the shaft causes rotational movement of the second ring within the port.

Preferably the second ring has slots therein, and the first ring has pins thereon positioned within the slots in the second ring, the slots being shaped such that rotational movement of the second ring with respect to the first ring causes translational movement of the second ring during a first operation of the control member.

Preferably the slots are further shaped so that further rotational movement of the second ring with respect to the first ring causes rotational movement of the second ring to cause the reference surface to extend across the port during a further operation of the control member.

Preferably rotation of the control member causes the second ring to rotate with respect to the first ring.

In a further aspect the invention resides in a camera including therewith a positioning device as claimed in any one of the preceding paragraphs.

Preferably the camera is underwater camera and/or a camera inside an underwater camera.

To those skilled in the art to which the invention relates, many changes in construction and widely differing embodiments and applications of the invention will suggest themselves without departing from the scope of the invention as defined in the appended claims. The disclosures and the description herein are purely illustrative and are not intended to be in any sense limiting.

BRIEF DESCRIPTION

The invention will now be described, by way of example only, by reference to the accompanying drawings in which:

FIG. 1 is a cross sectional view of a positioning device for a reference surface in accordance with a first preferred embodiment of the invention, FIG. 2 is a perspective view of a gear system usable in the device of FIG. 1, FIG. 3 is plan view of part of white balance device usable in the device of FIG. 1, FIG. 4 is a perspective view a rotatable ring usable in the device of FIG. 1, FIG. 5 is a view of the ring of FIG. 4 from the opposite side FIG. 6 is a view as in FIG. 1 with the white balance device partly extended, FIG. 7 is an underneath perspective view of a retaining ring and linking bars usable in the device of FIG. 1, FIG. 8 shows the retaining ring of FIG. 7 mounted on the port body, FIG. 9 is a cross-sectional view of the white balance device forming part of the preferred form of the invention, FIG. 10 is a perspective view of a blade forming part of the reference surface in the white balance device forming part of a preferred form of the present invention, FIG. 11 is a perspective view of blades in a layer of blades, FIG. 12 is an underneath view of a bottom cover showing a blade activator in a preferred form of the invention, FIG. 13 is an underneath perspective view of a the construction of FIG. 12 showing the blade activator in a second position, FIG. 14 is a view as in FIG. 13 with the blade activator in a third position, FIG. 15 a plan view of the white balance device of the invention with the blades withdrawn, FIG. 16 is a view as in FIG. 15 with the blades extended, FIG. 17 is a perspective cut away view of the device of FIG. 1 with the blades extended, FIG. 18 is a side elevation of the structure of FIG. 2, FIG. 19 is a perspective view of a stopper engageable with the structure of FIG. 18, FIGS. 20, 21 and 22 are a top perspective views of the port body showing the stopper in three differing positions, and FIG. 23 is an underneath perspective view of the rotating ring showing the stopper preventing rotation of the blade activator.

DESCRIPTION OF DRAWINGS

The following description will describe the invention in relation to preferred embodiments of the invention, namely a positioning device for a reference surface. The invention is in no way limited to these preferred embodiments as they are purely to exemplify the invention only and that possible variations and modifications would be readily apparent without departing from the scope of the invention.

Figure 1:
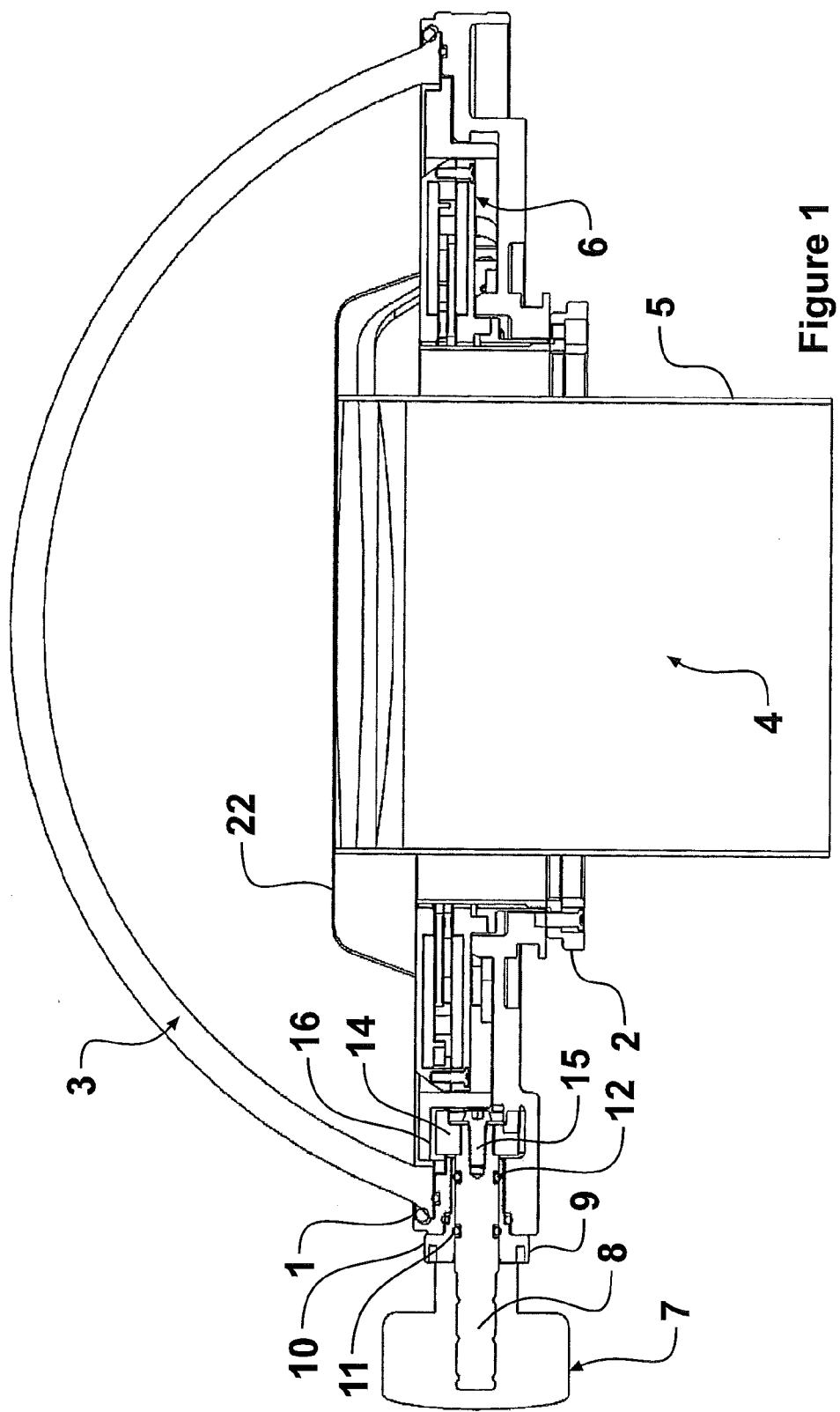
FIG. 1 shows a lens port 1 which is attachable in use to an underwater camera housing, for example by means of threads at 2. The port has an end cover such as transparent dome 3 formed, for example, of glass. The lens has a longitudinal axis in the direction of arrow 4 and receives the lens 5 of a camera. A reference surface is provided which in the preferred form of the invention comprises a reference surface for adjusting the white balance of the camera. The reference surface is able to be extended across the port 1 in front of the camera lens 5 in use and withdrawn therefrom. Transverse movement means are provided to extend and retract the reference surface across and from the position in front of the lens 5. Translational movement means are also provided to move the retracted reference surface to a position clear of the field of view of the camera. The white balance device 6 is indicated generally in FIG. 1.
Figure 2:
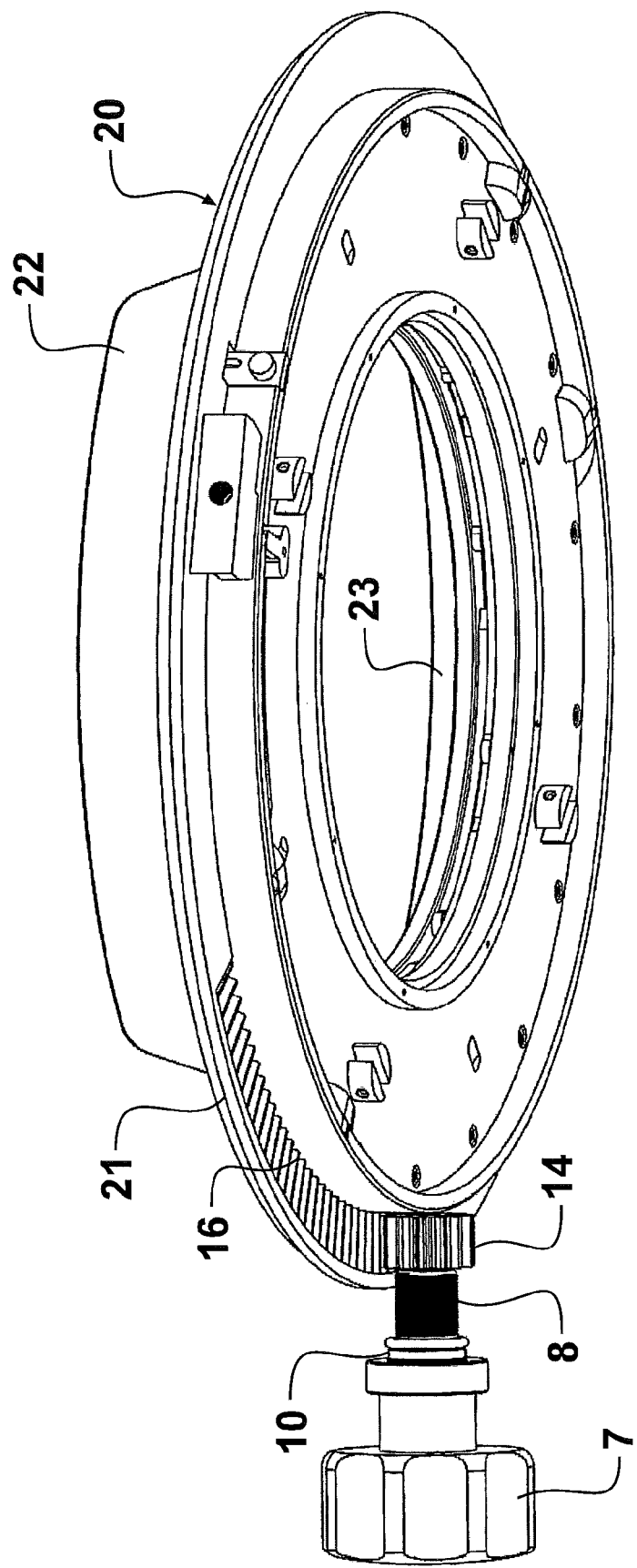

In order to operate the white balance device 6 a control member such as knob 7 is provided operable from apposition external of the lens port 1. The knob 7 includes a shaft 8 which passes through the wall of the lens port 1. The shaft 8 may pass through a collar like plug 10 which is sealed against water ingress by, for example "O" ring 11. Water ingress between the shaft 8 and the collar like plug 10 may be prevented by "O"-rings 12. The shaft 8 mounts a device to transmit rotation to the white balance device such as gear 14 which may be mounted by a screw 15 attached to the shaft 8. Gear 14 drives a ring gear 16 which forms part of a rotating ring member or second ring 20 which has an outwardly directed flange 21 which provides the ring gear 16.

Figure 4:
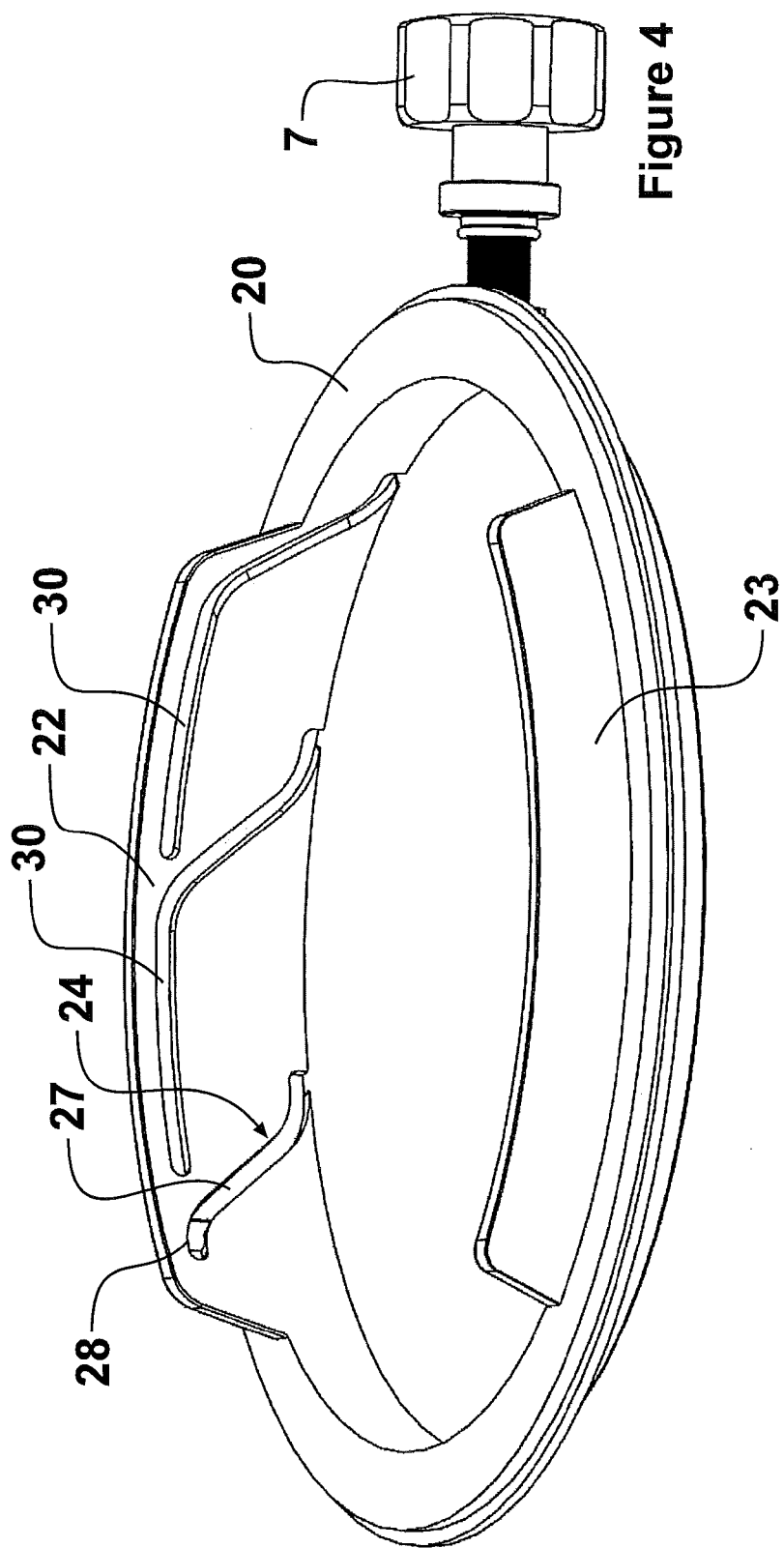
Figure 5:
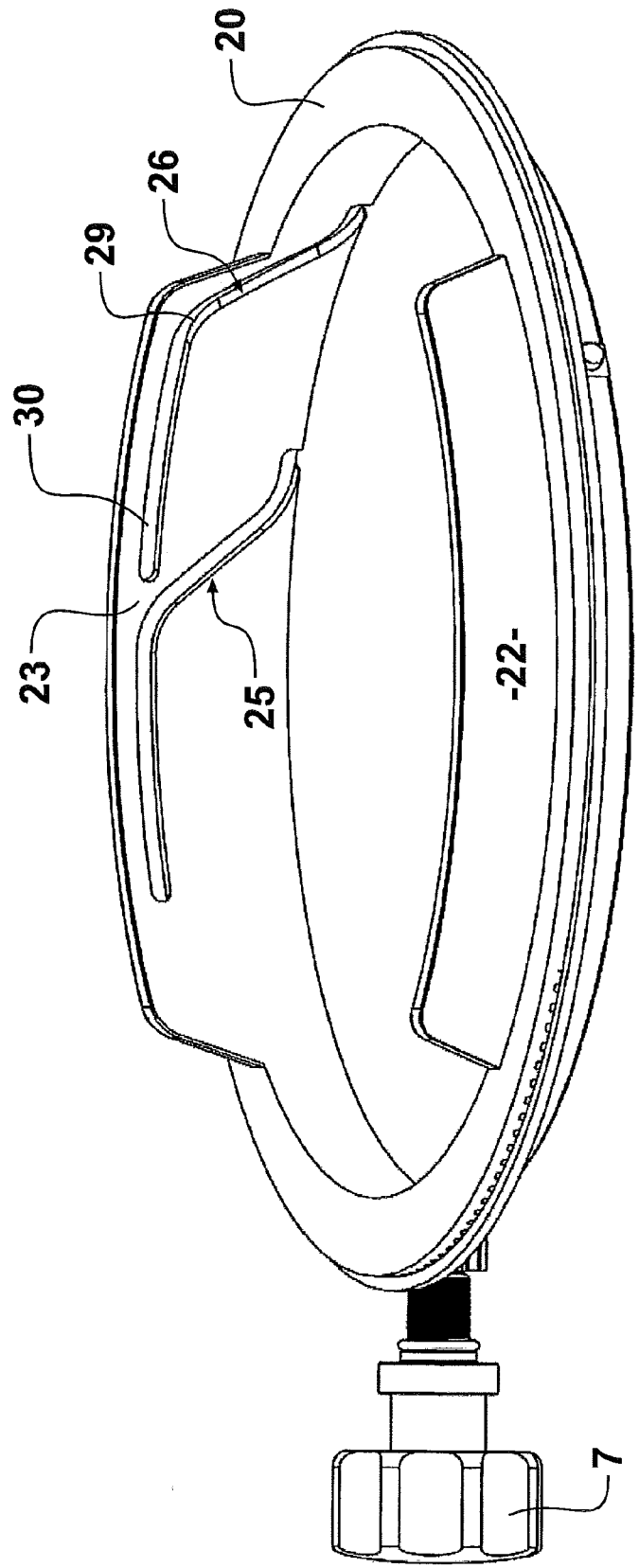

The ring member 20 carries on the face thereof opposite the ring gear 16 a pair of arcuate ribs 22 and 23. Alternatively a tubular member could be used. The arcuate part 22 has a plurality, such as three, slots 24, 25 and 26 therein. The slot 24 has a ramp part 27 and a short circumferential part 28 while the slots 25 and 26 each have a ramp part 29 and a longer circumferential part 30. The slots 24, 25 and 26 extend into the body of the ring member as can be seen in FIGS. 4 and 5. The arcuate part 23 does not have an equivalent slot to slot 24 but does have two slots equivalent to slots 25 and 26 with ramp parts 29 and 30.

Figure 3:
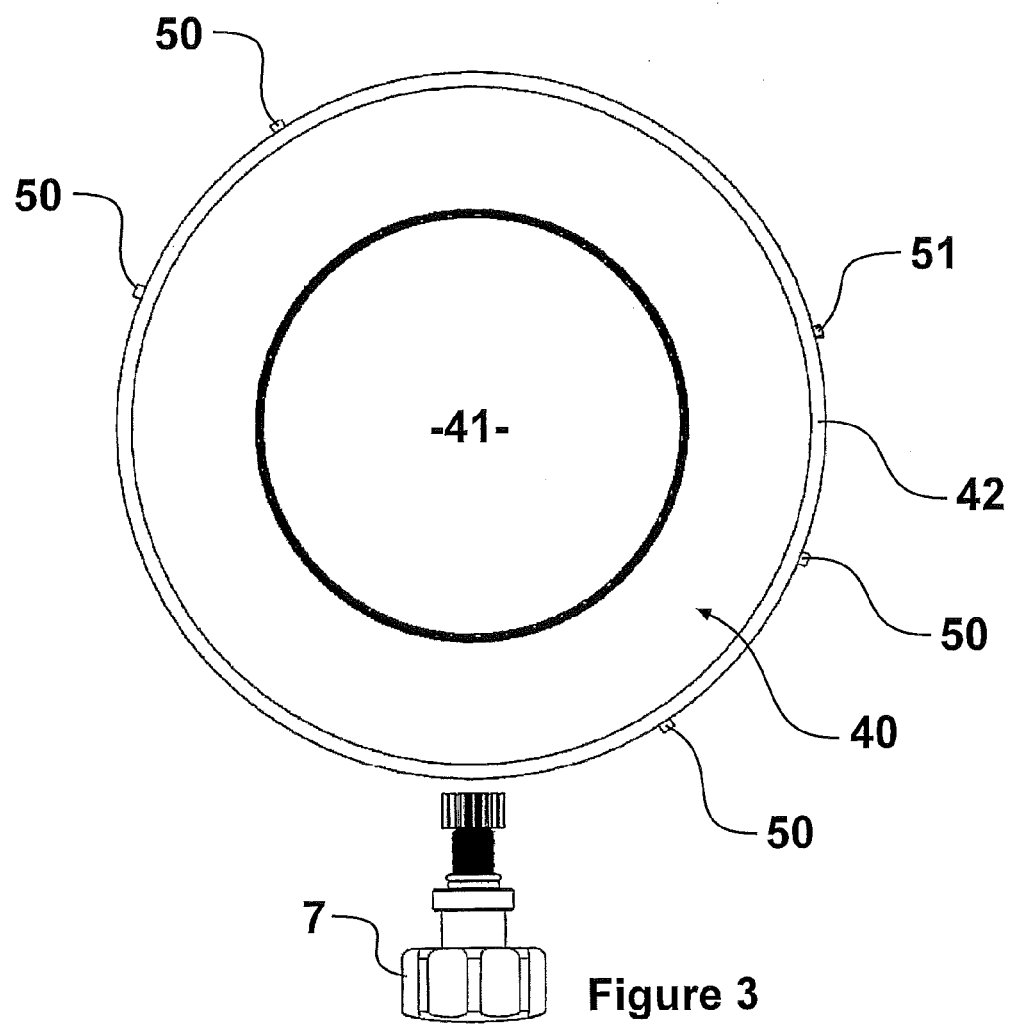

Contained between the arcuate parts 22 is the white balance device 6. The white balance device 6 (FIG. 3) includes a bottom cover 40 with a central aperture 41 of sufficient size not to obstruct the operation of the camera and having a circumferential rib 42. The white balance device 6 further includes a top cover 45 which also has a central aperture as for the bottom plate 40. The top cover 45 has a circumferential rib 46 which meets or engages the rib 42.

The circumferential rib 42 carries a number of, in particular four, pins 50 which engage in the slots 25 and 26 in the rotatable ring 20. A blade activator pin 51 also extends from the rotatable ring 20 into the slot 24. In each case the pin travels along the slot as the ring 20 rotates relative to the white balance device 6. The circumferential member 42 of the white balance device 6 thus forms a first ring carrying pins 50 which move in the slots 25, 26 in the second ring.

Figure 6:
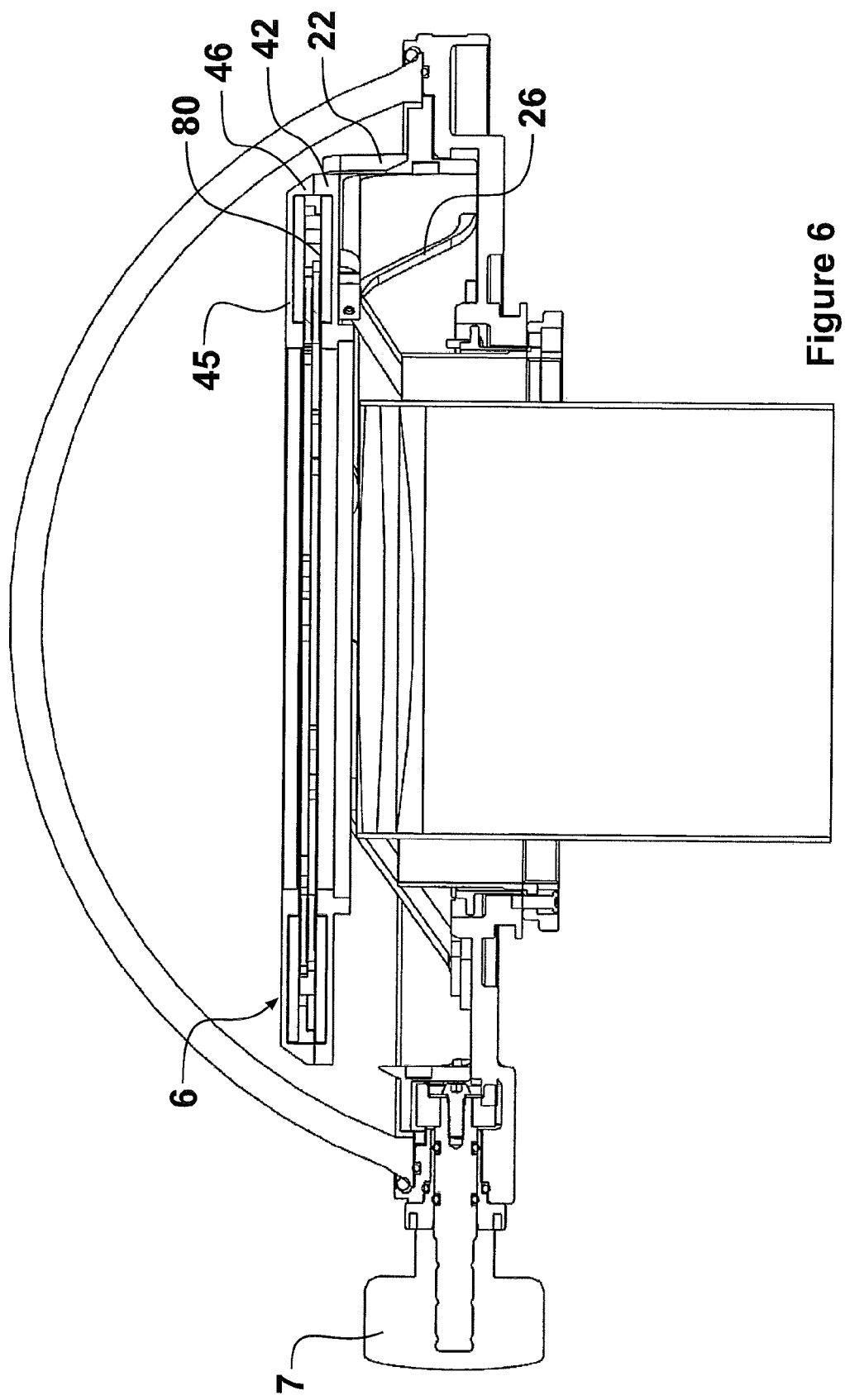
Figure 7:
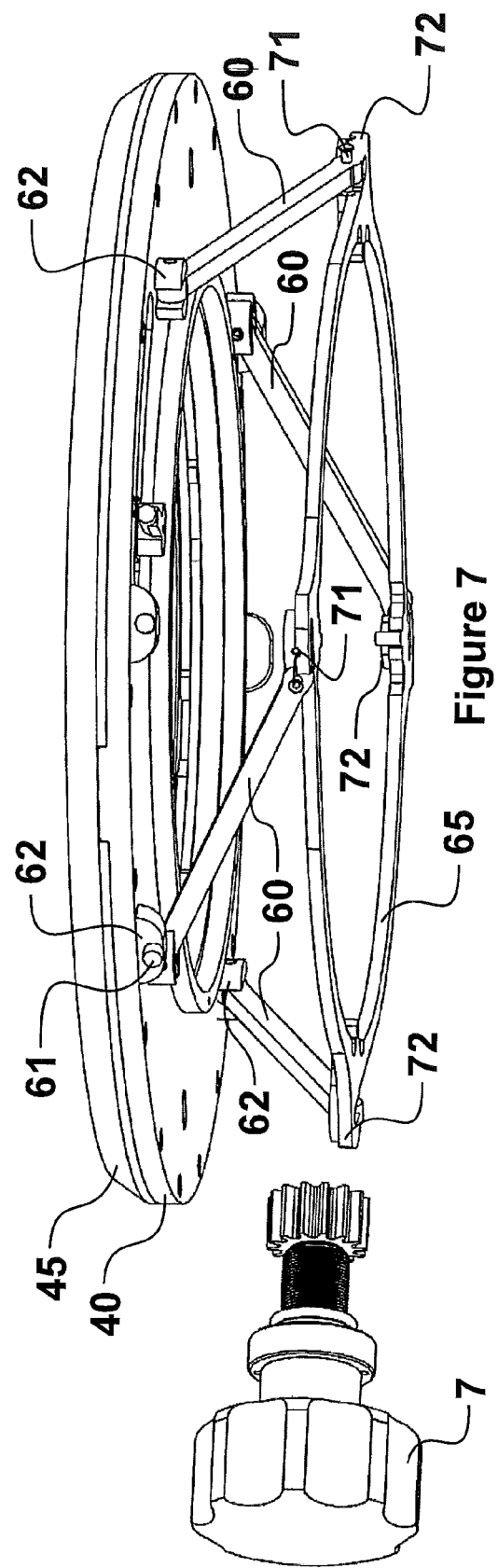

As the pins 50 and the blade activator pin 51 travel along slots 25, 26 and 24 respectively the white balance device 6 is raised to the position shown in FIG. 6. That is to say the white balance device 6 moves from a first position as shown in FIG. 1 to a second position as shown in FIG. 6.

Figure 8:
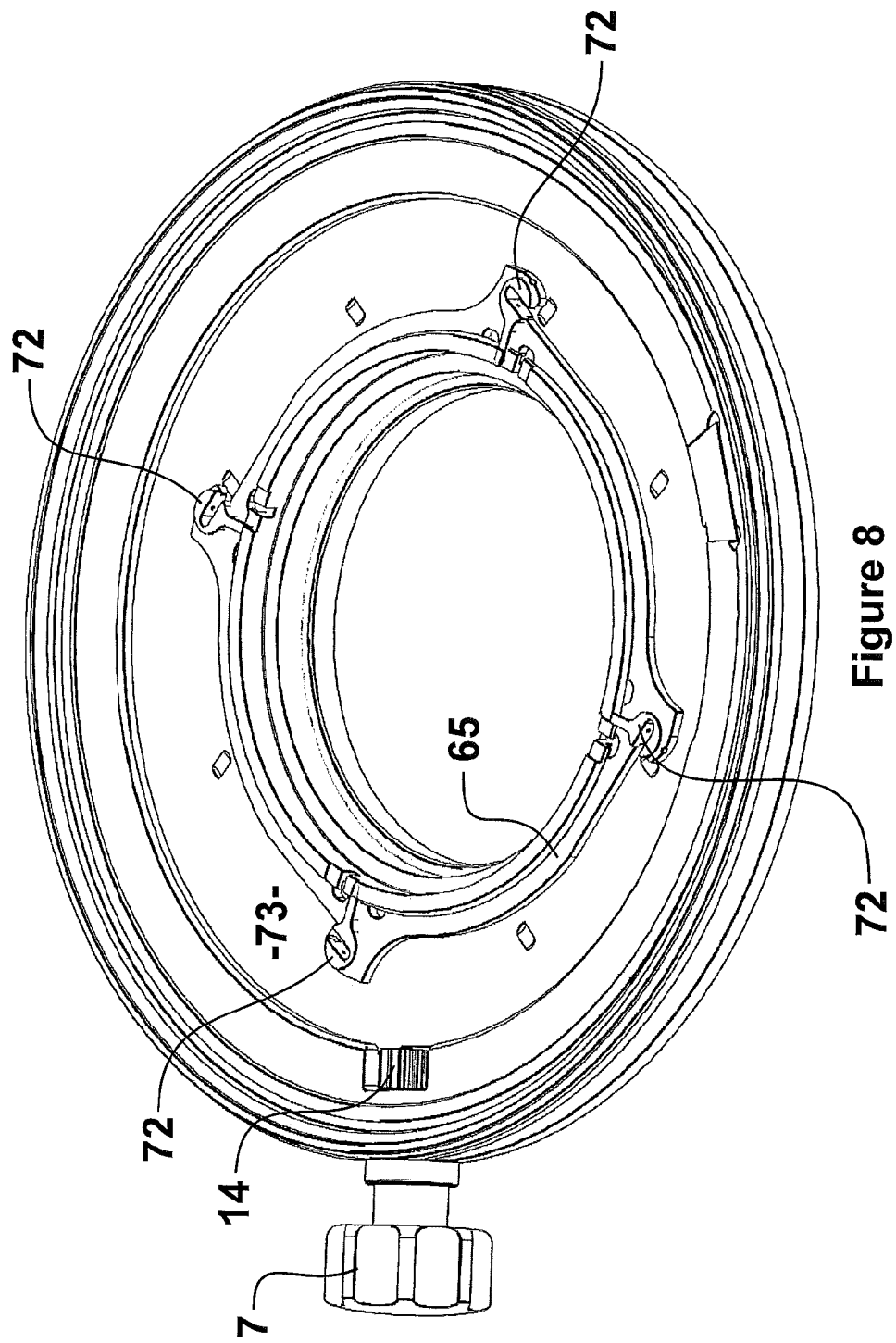
Figure 9:
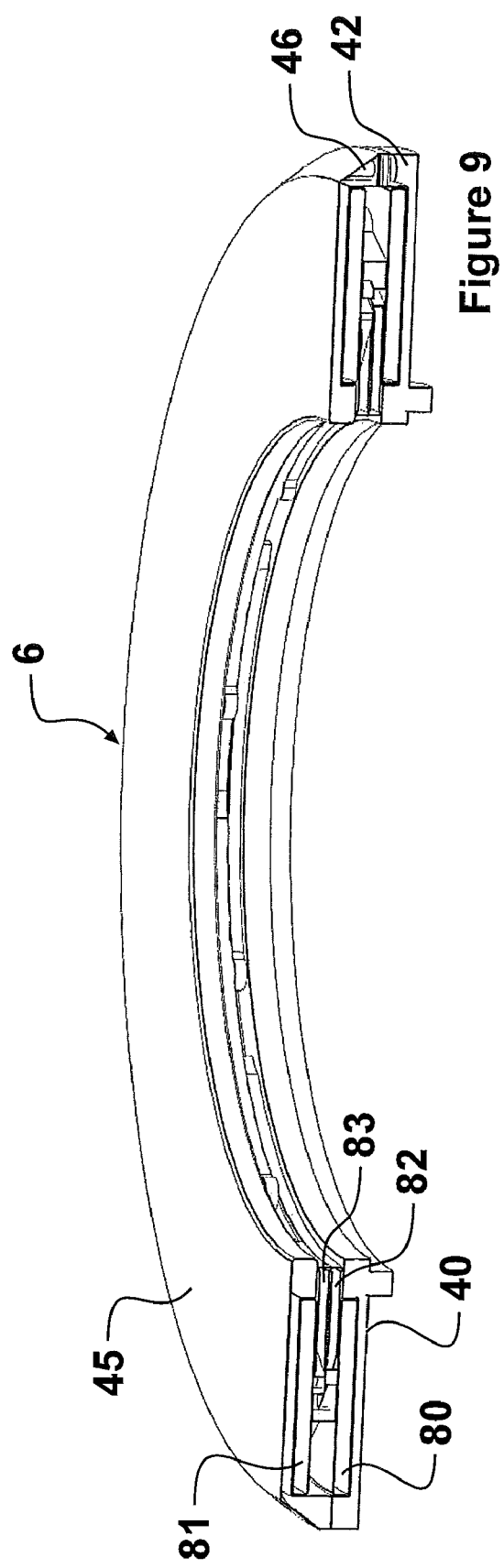

A plurality of legs 60, for example four legs 60 connect the white balance device 6 to the body of the lens port 1. The legs 60 are pivotally connected to the bottom plate 40, for example by providing a pin or axle 61 on the leg 60 which engages in a receiving block 62 provided on the plate 40. At the other end of legs 60 the legs 60 are pivotally connected to a retainer ring 65 which is rigidly attached to the body of port 1. Pivotal attachment of the legs 60 to retainer ring 65 may again be by way of pivot pins 71 in a receiving block 72. This holds the white balance device 6 against rotation as the rotatable ring 20 rotates. Thus rotation of knob 7 will cause ring 20 to rotate but as the white balance device 6 is held against rotation the pins 50 and 51 will move along the slots 25, 26 and 24. FIG. 8 shows the retainer ring 65 held on an inwardly extending flange 73 forming part of the body of port 1.

Figure 10:
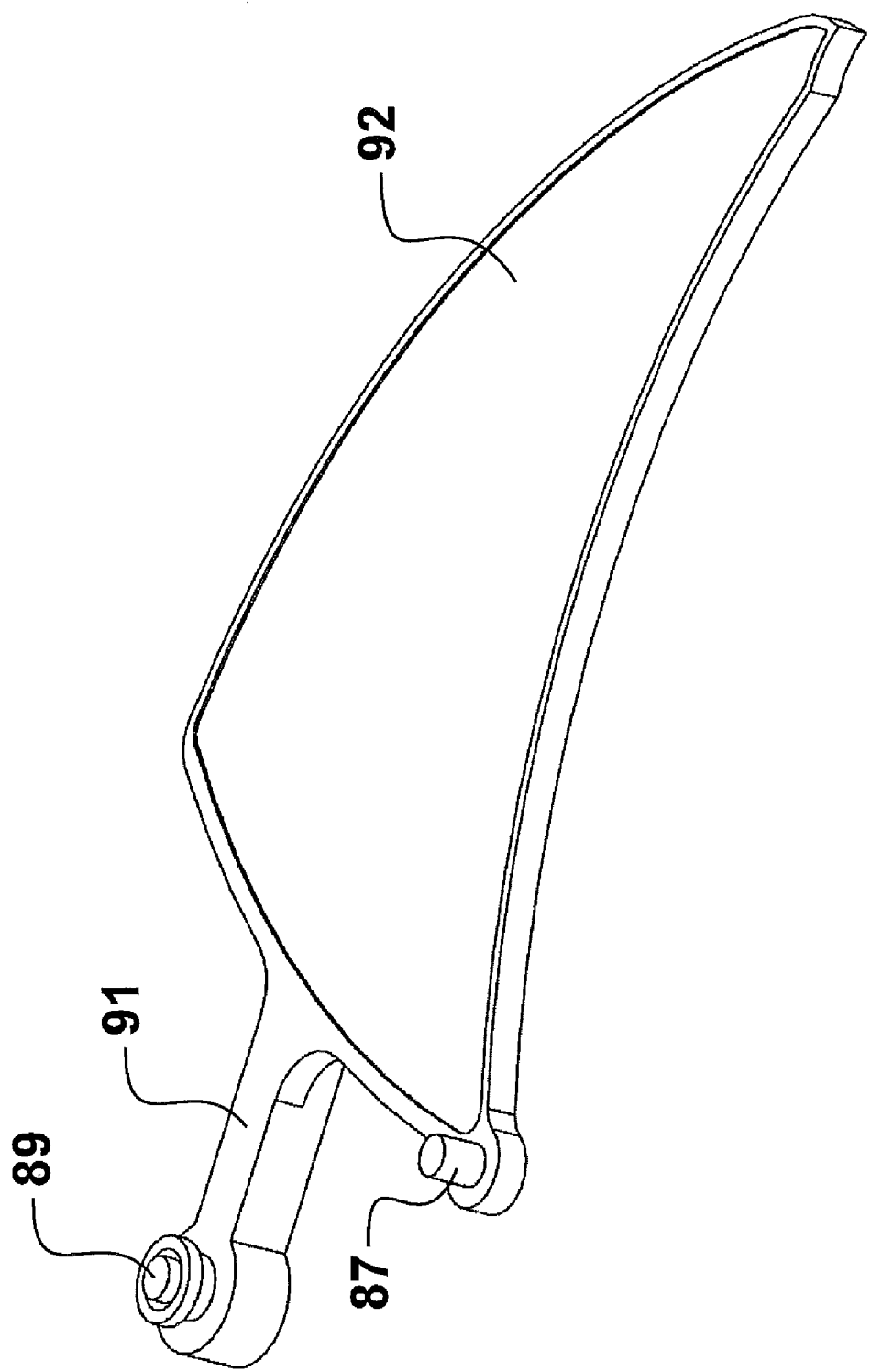
Figure 11:
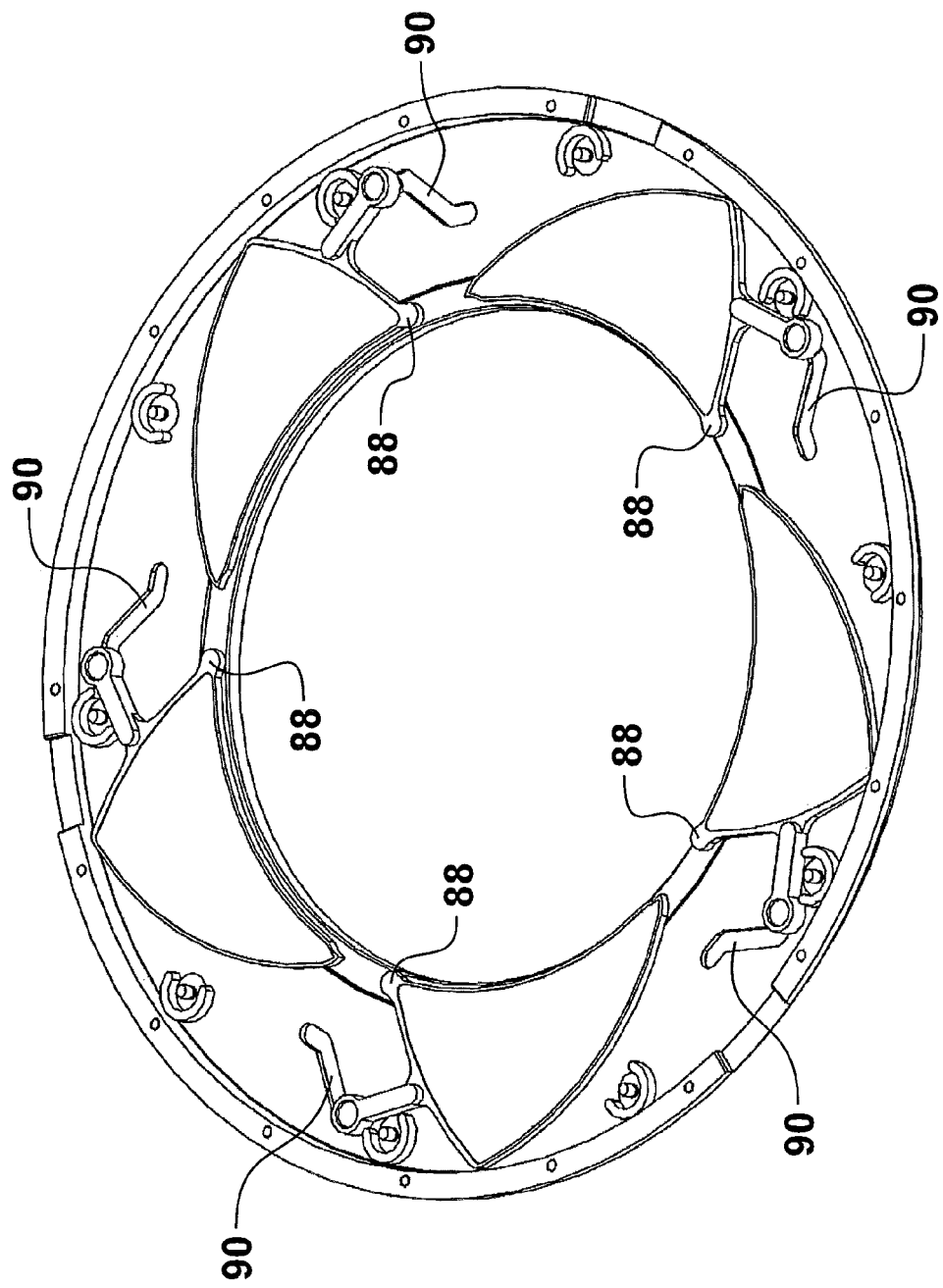
Figure 12:
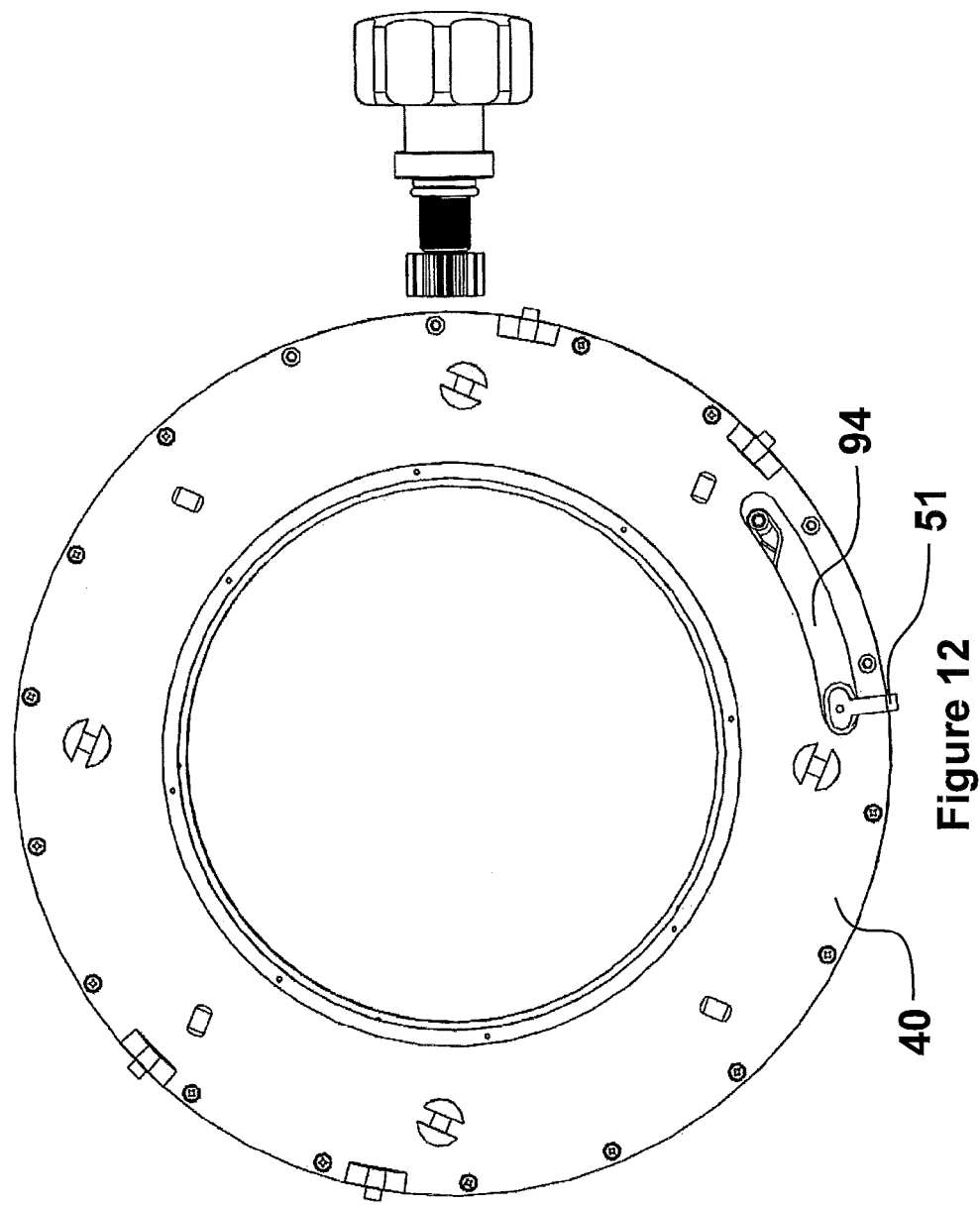

The white balance device comprises of six layers. The outer layers are the bottom cover 40 and the top cover 45 previously described. The layers 40 and 45 may be connected by screws around their circumferences. Within a case formed by the covers 40 and 45 are a bottom plate 80 and a top plate 81 which are free to move in a rotational manner with respect to the covers 40 and 45 but are held within the covers 40 and 45 by the peripheral ribs on the covers 40 and 45. Between the plates 80 and 81 are two layers of blades 82 and 83 which provide the extendable and retractable reference surface. There may be about five and preferably five blades in each layer 82 and 83. The blades are somewhat triangular in shape but modified by a twist along their length. The shape of the blades can best be seen in FIG. 10. The layers of blades, when extended are such that the blades in one layer overlap the spaces in the other layer. Each blade is mounted to the adjacent cover 40, 45 and plate 80, 81. This may be achieved by providing a fixed pivot pin 87 which is placed in apertures at 88 in the covers 40, 45 and a further pivot pin 89 which moves in slots 90 in the adjacent plate 80 or 81. As can be seen in FIG. 10 the pin 89 is displaced away from the main body of blade 82, 83 by an arm 91. FIG. 11 shows the top blade cover 40, top blade plate 81 and top layer of blades. As can be seen in FIG. 11 the slots 90 are dog legged to achieve the desired movement in use.

Each blade 92 in a layer is translucent.

The blades 92 in the bottom layer are similar to those in the top layer save that the pins are on the opposite side of the blade.

Figure 13:
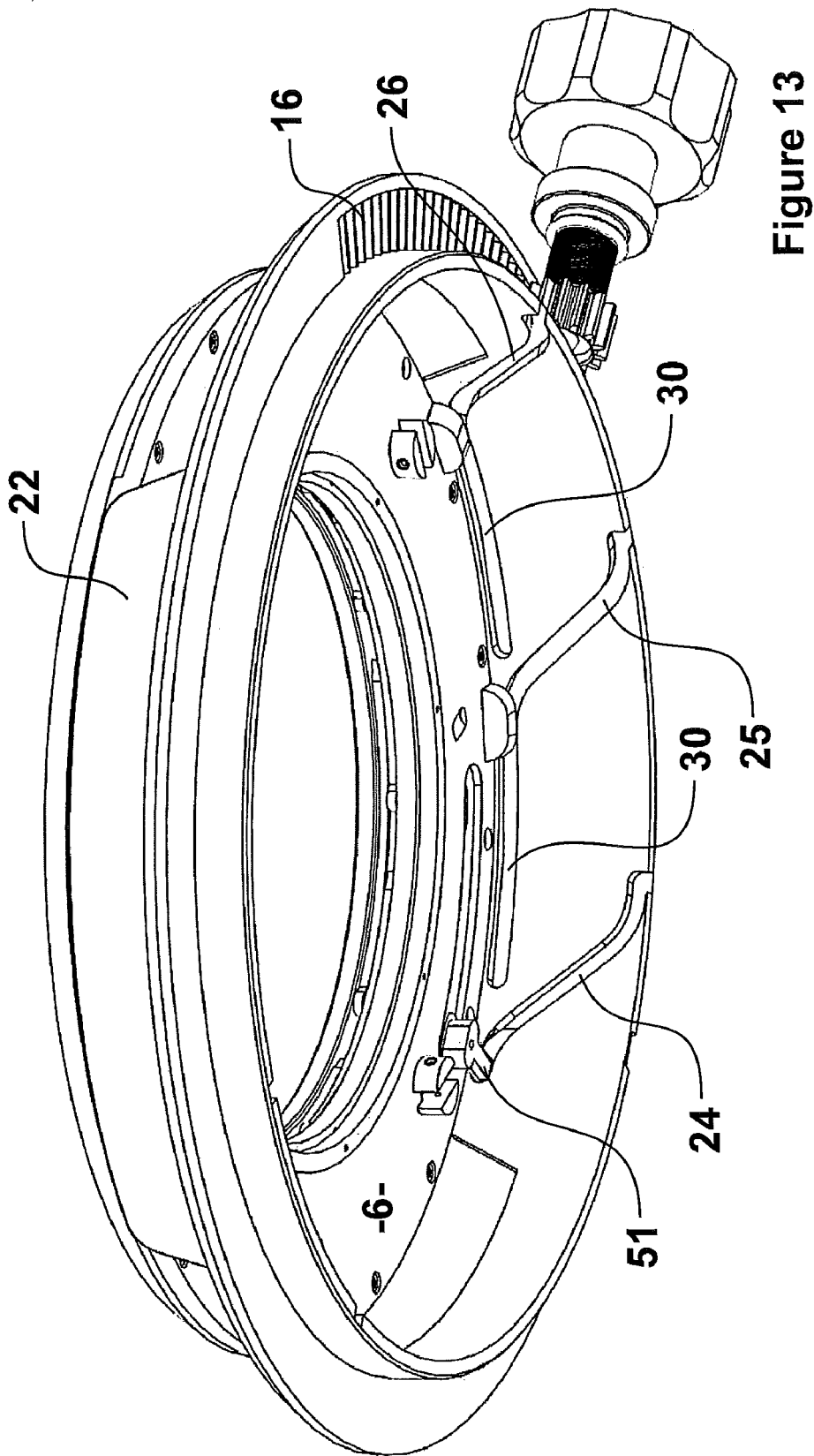
Figure 14:
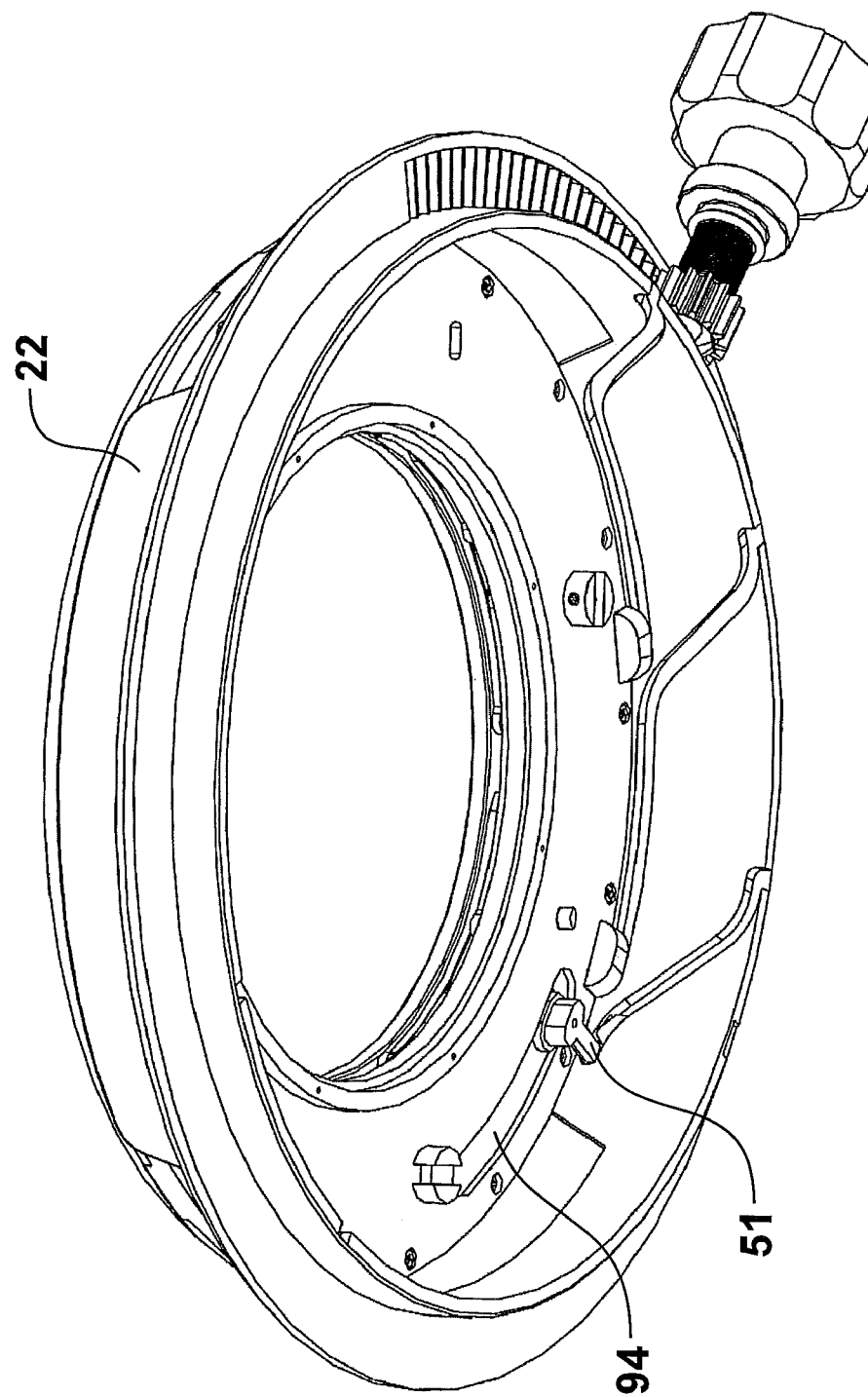

The blade activator pin 51 is rigidly attached to the top and bottom plates 80 and 81 so that relative movement between the blade activator and the covers 40, 45 causes the blade activator to move along a slot 94 in the bottom cover 40. When the white balance device 6 reaches the second position shown in FIG. 6 the blade activator pin 51 will have reached the end of its slot 24. Thus whilst the pins 50 will continue to move in the circumferential parts 30 of slots 25 and 26 the pin 51 is not able to move further so that rotation of the top and bottom plates 80 and 81 occurs relative to the top and bottom covers 40 and 45. FIG. 13 shows the position of the blade activator pin 51 with the white balance device 6 in the second position and FIG. 14 shows the position of the blade activator pin 51 with the white balance device 6 in the third position.

Figure 15:
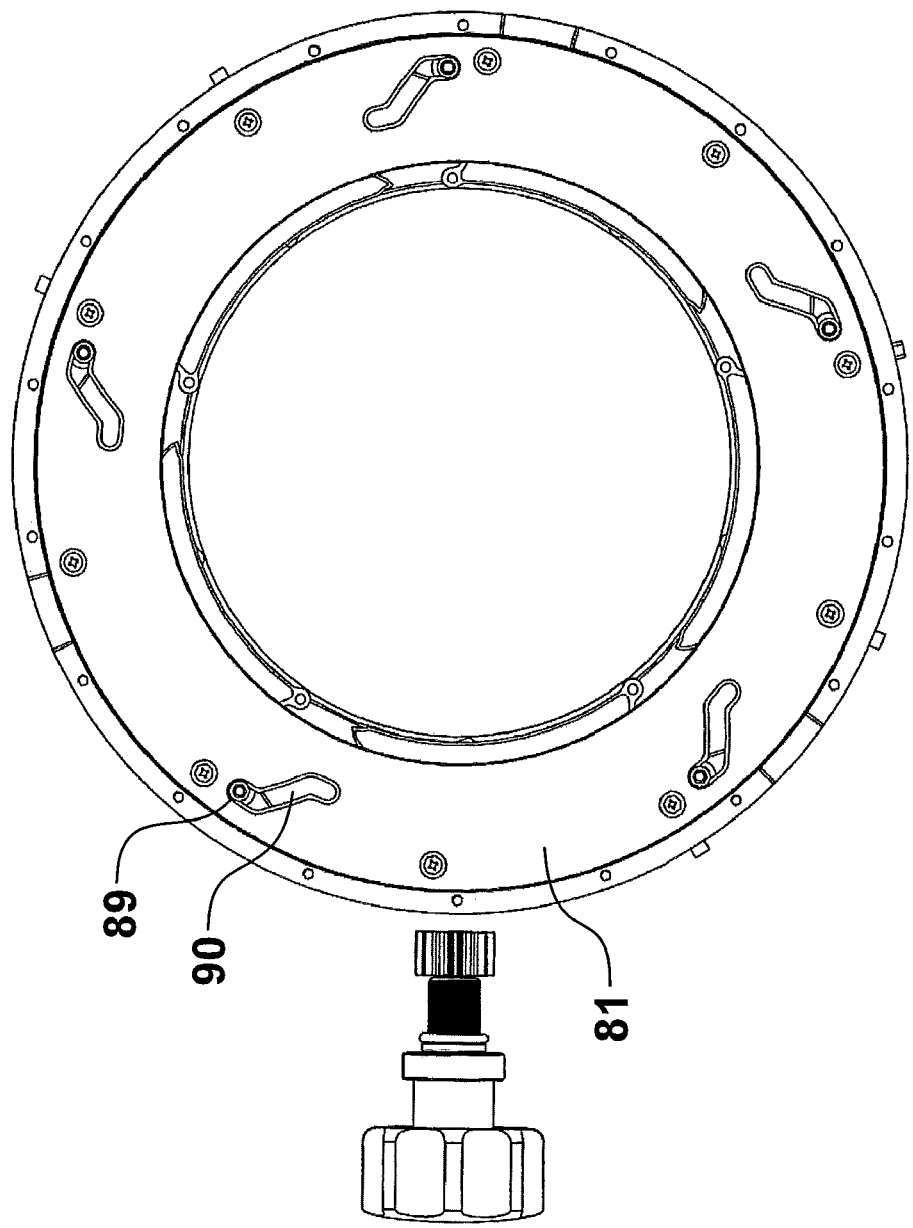
Figure 16:
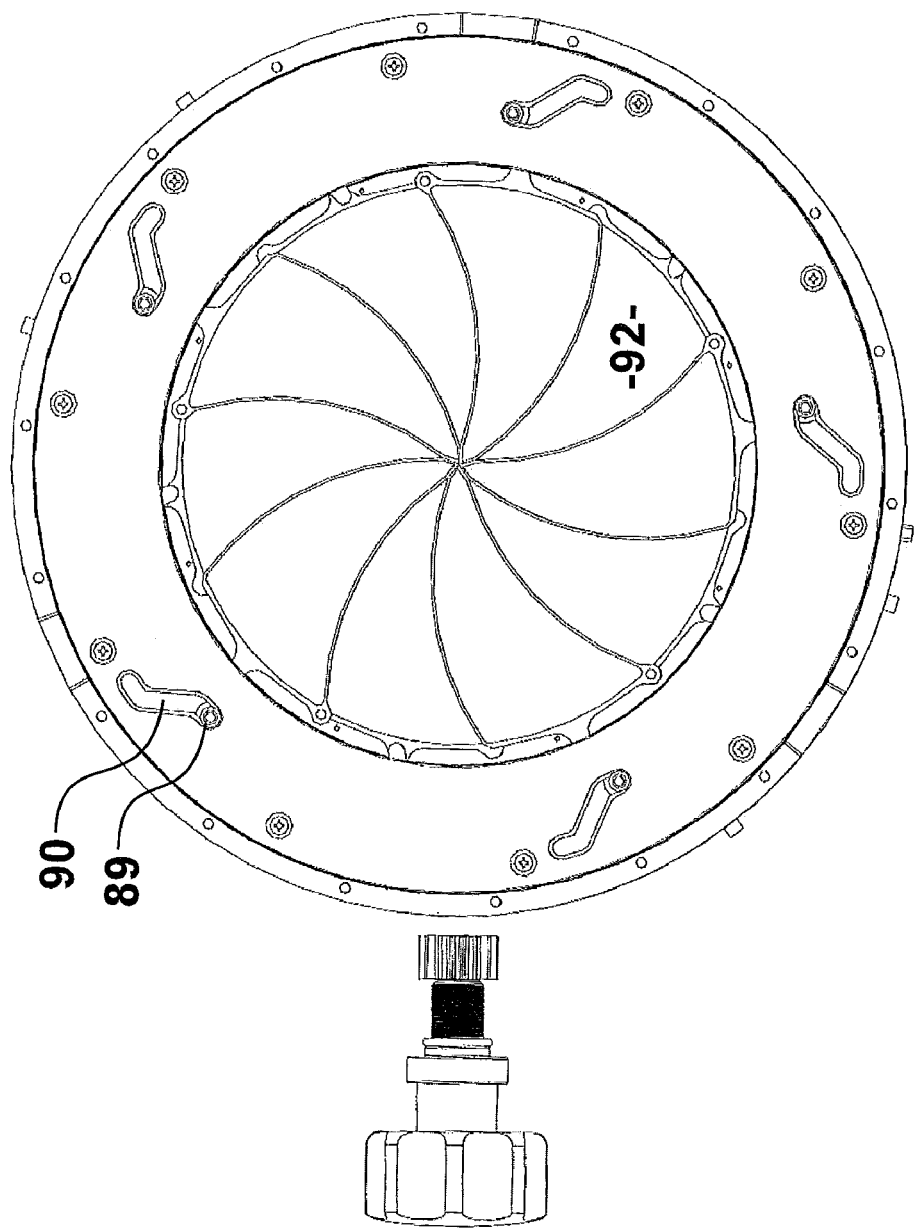
Figure 17:
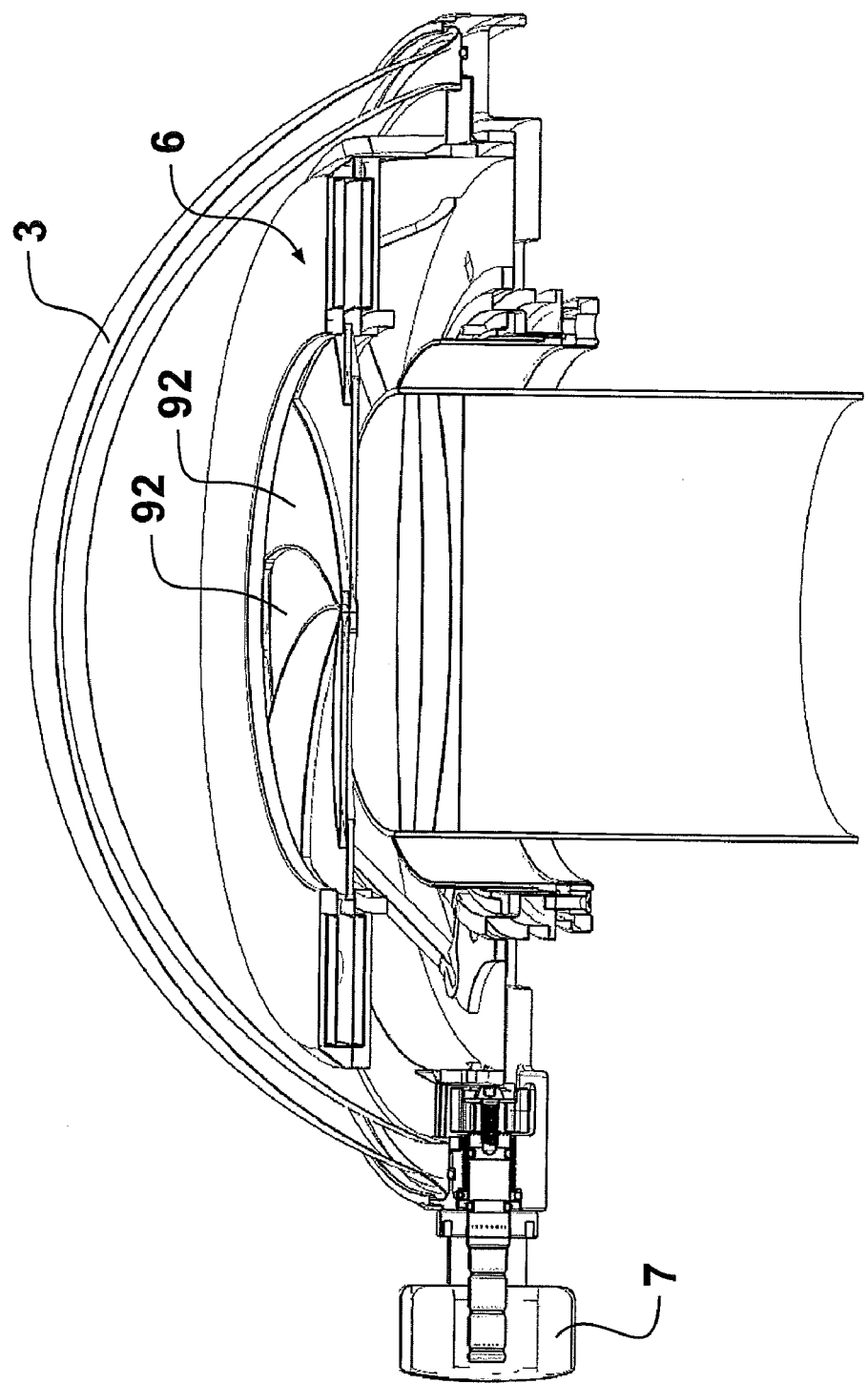
Figure 18:
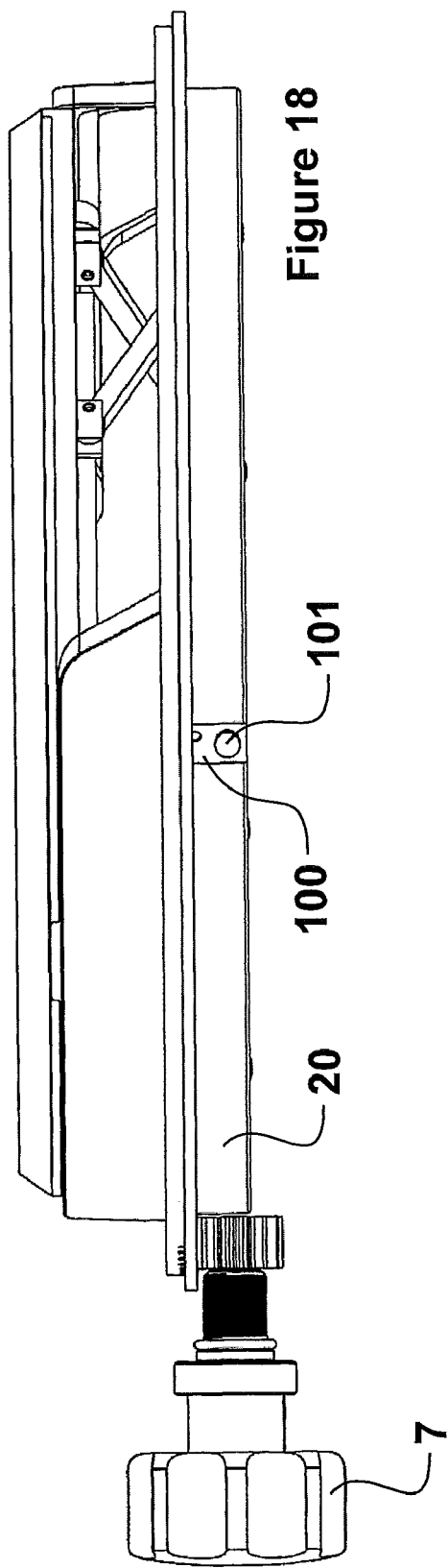
Figure 19:
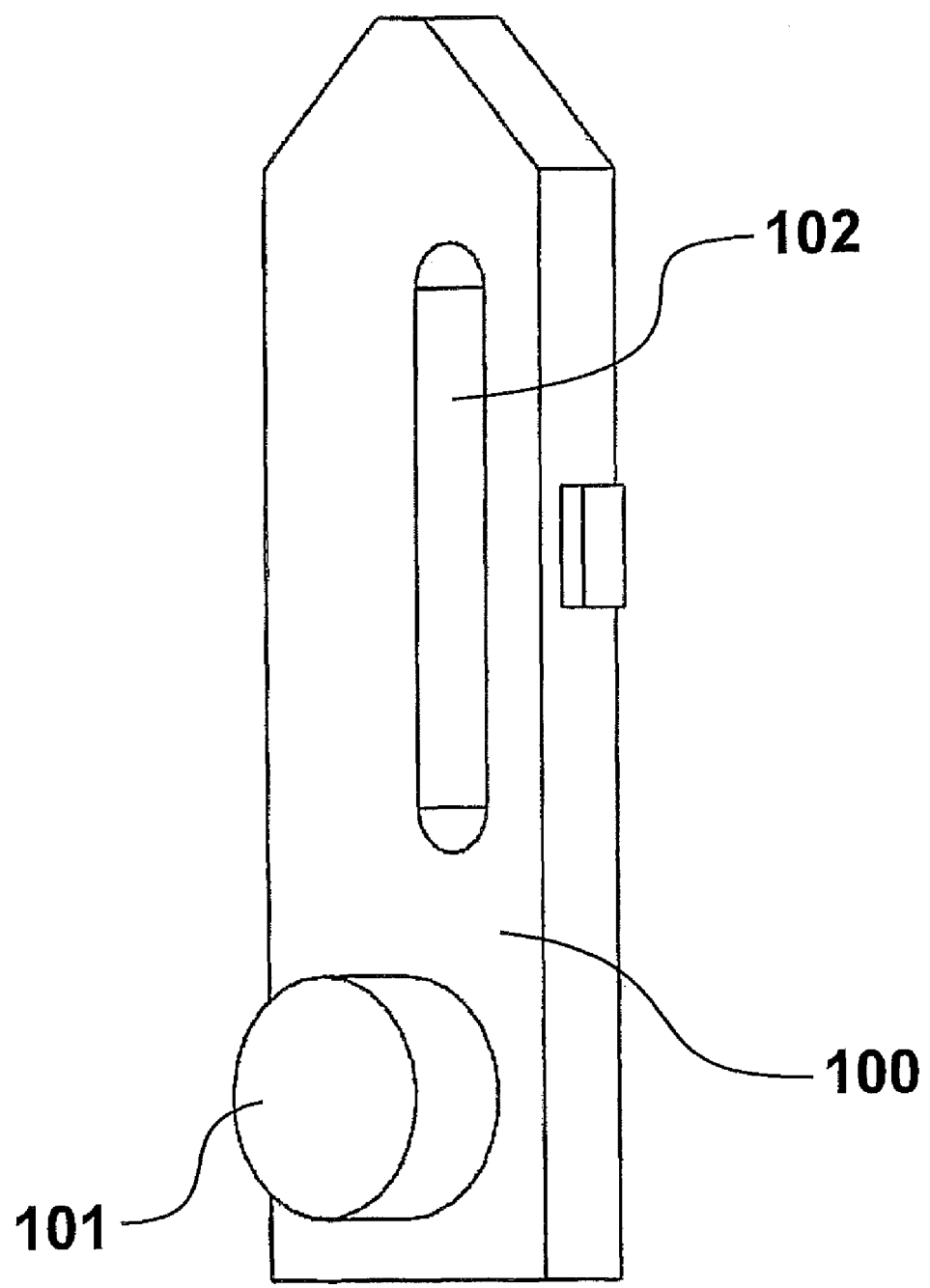
Figure 20:
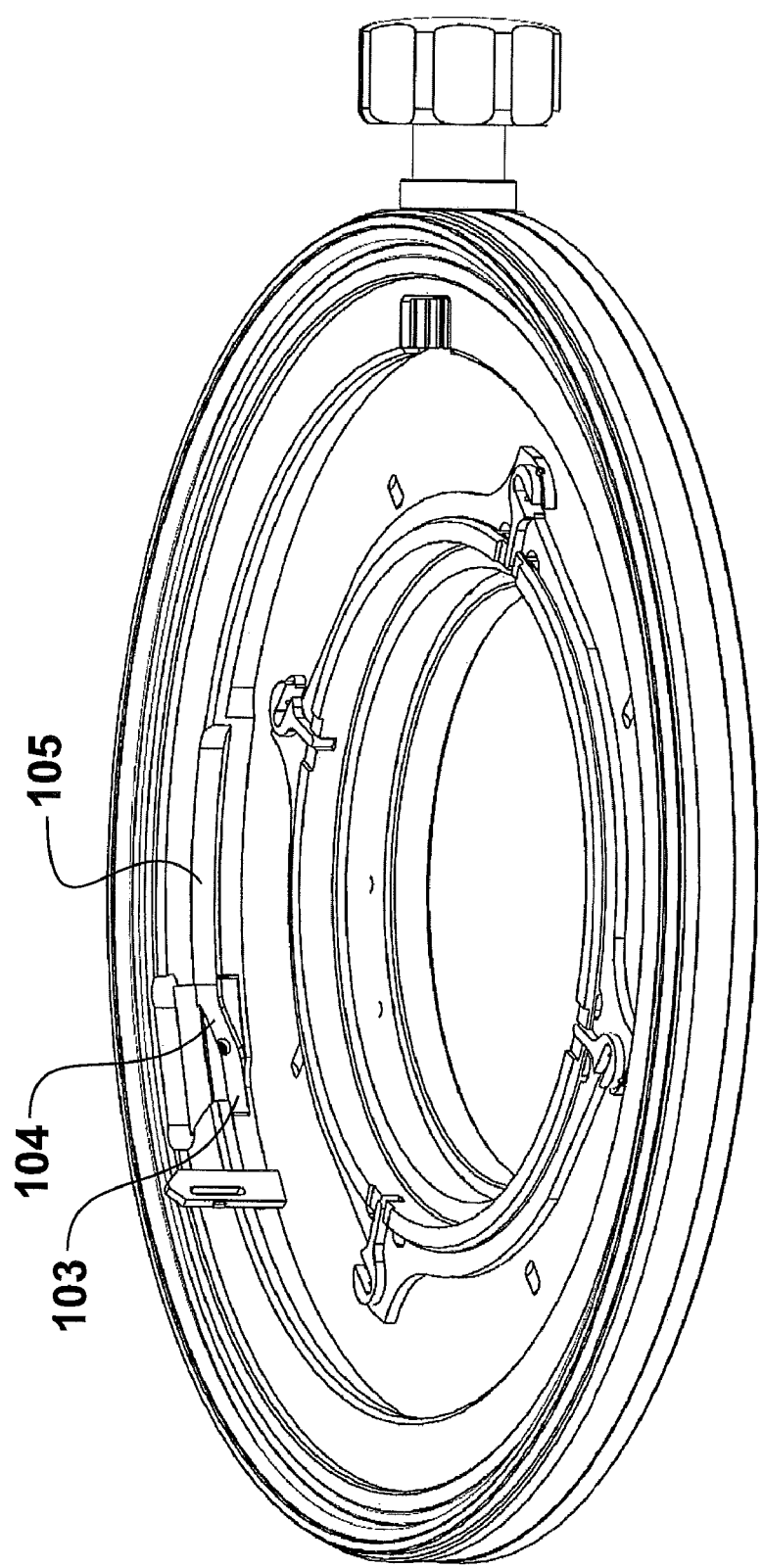
Figure 21:
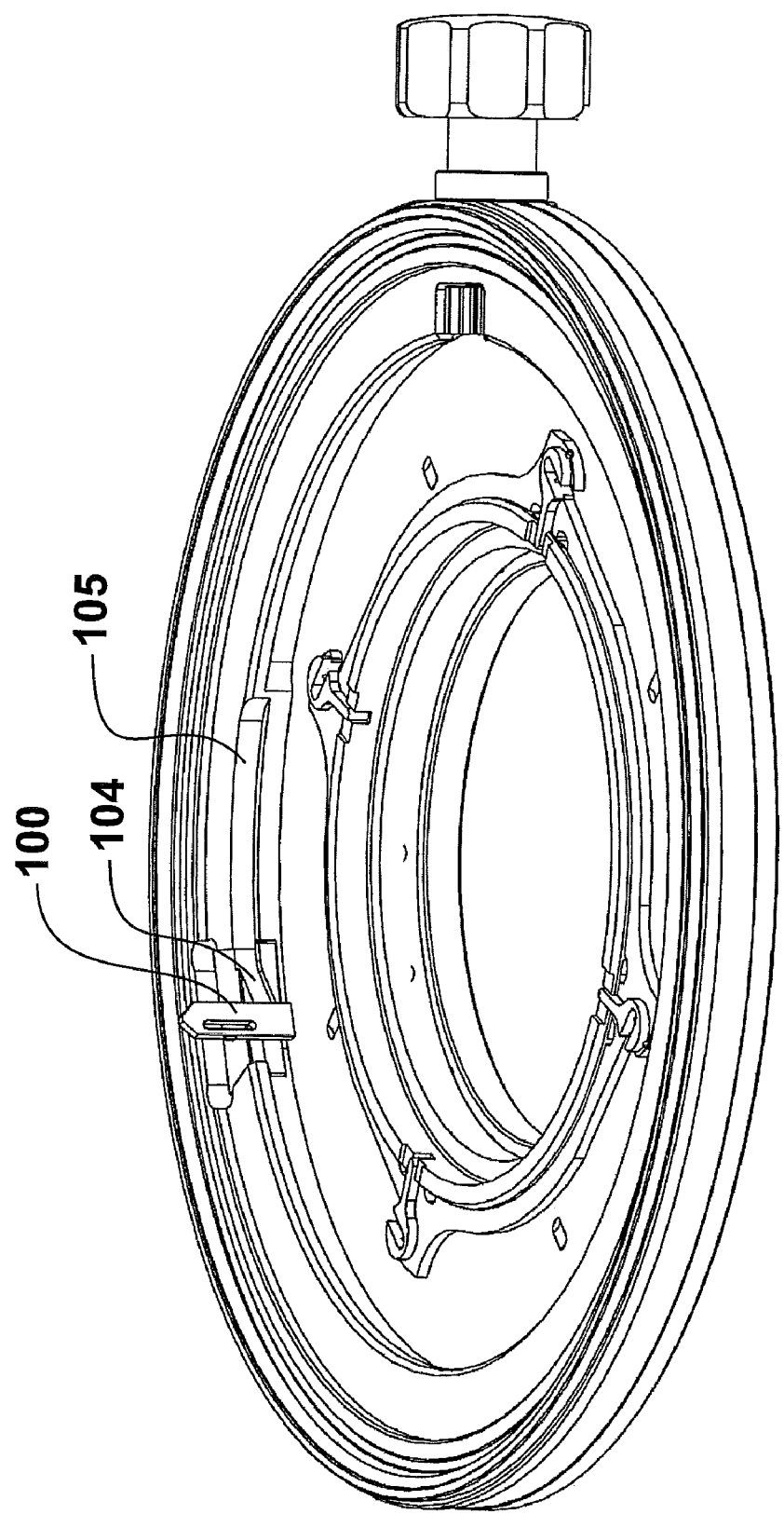
Figure 22:
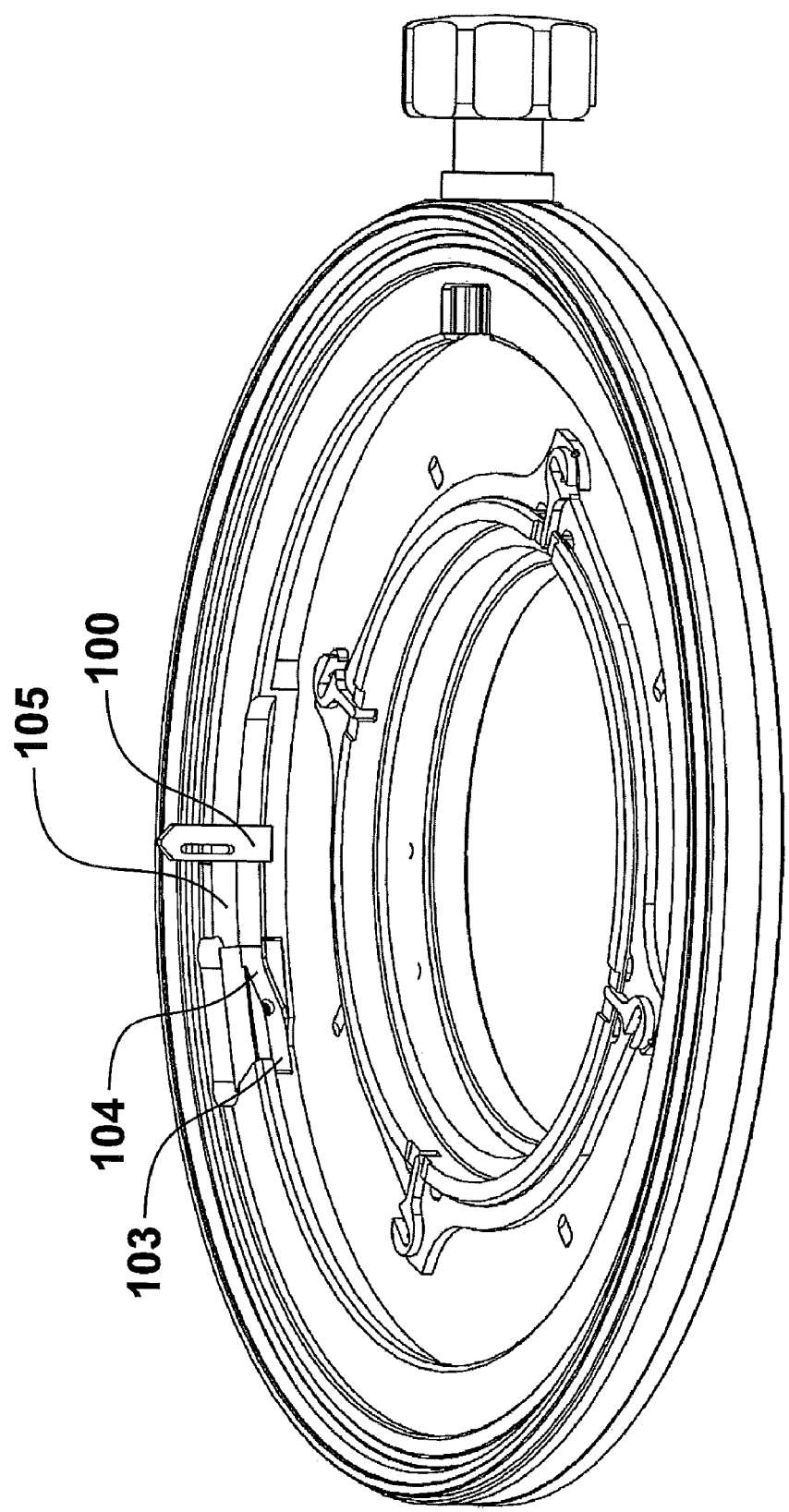
Figure 23:
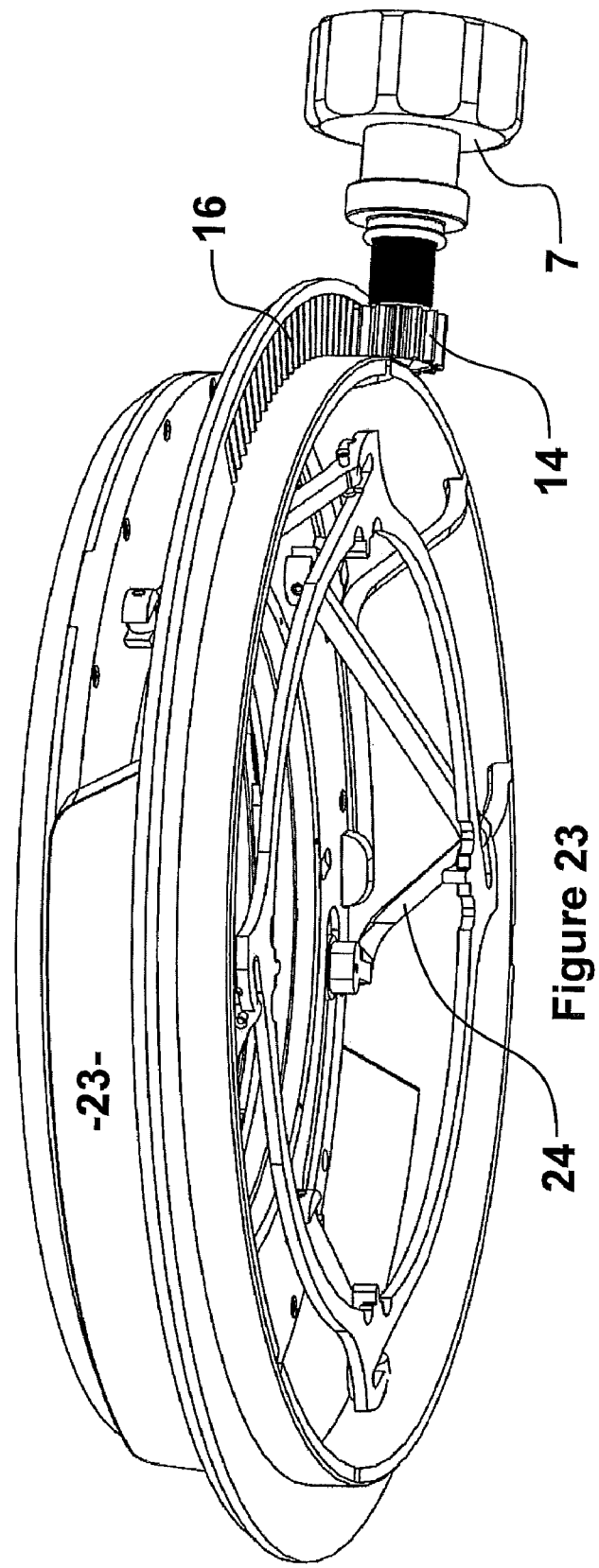

As the top and bottom blade plates 80 and 81 turn the pins 89 of the blades are forced to travel along the slots 90 in the top and bottom plates 80 and 81 causing the blades to rotate outwardly to form the disc shown in FIG. 16. As can be seen the pin 89 has moved the length of slot 90 between the positions shown in FIGS. 15 and 16. FIG. 17 also shows the blades 92 in the extended or third position. FIG. 17 also shows that the blades 92 are in two layers.

Turning now to FIGS. 18 to 22 a stopper 100 is incorporated into the rotatable ring 20. The stopper 100 has an outwardly extending pin 101 and a slot 102 therein. The pin 101 extends into a slot 103 in the body of the port 1. The slot 103 has a sloping part 104 and a circumferential part 105.

As the rotatable ring 20 turns the pin 101 travels along the slot 103 and when the pin reaches the sloped part 104 of the slot 103 the stopper 100 moves upwardly (with respect to FIG. 21) in a direction parallel to the axis of rotation of the ring 20 before reaching the circumferential part 105 of slot 103. The stopper is positioned to prevent return movement of the blade activator pin 51 when the stopper 100 is extended.

When the knob 7 is turned in the opposite direction to withdraw the reference surface formed by the blades 92 the pins 50 move in the slots 25 and 26 to return to the end of the ramp part of the slots 25 and 26 while the stopper 100 prevents the blade activator pin 51 from moving. The relative rotation between the blade plates 80 and 81 which are connected to the blade activator pin 51 and the blade covers 40 and 45 leads to the retraction of the blades 92. When the white balance device returns to position 2 as shown in FIG. 6 the pin 101 enters the sloped part 104 of the slot 103 and the stopper 100 is withdrawn allowing the pin 51 to move in its slot 24. Further rotation of the knob 7 causes the white balance device to return to position 1 as shown in FIG. 1.

In use and as described above with the white balance device initially in position 1 rotation of knob 7 in the extension direction will firstly cause the white balance device to move to the second position as shown in FIG. 6 before the blades 92 are extended to form a reference surface against which a white balance adjustment may be made. Rotation of the knob 7 in the opposite direction will firstly retract the blades 92 and then cause the white balance device 6 to move longitudinally back behind the lens.

Advantages
  a) The construction of the invention allows the white balance of a camera in use underwater to be simply adjusted without having to remove the camera from the underwater photography housing and without having to carry extra pieces of equipment. The need to select somewhat white objects underwater is also obviated or minimised.
  b) The construction of the invention is also simple to operate and no complexity is added in inserting or removing the camera from the underwater photography housing.

Variations

Throughout the description of this specification, the word "comprise" and variations of that word such as "comprising" and "comprises", are not intended to exclude other additives, components, integers or steps.

The invention claimed is:

1. A positioning device for a reference surface within a lens port having a longitudinal axis, comprising:
   a reference surface means able to be extended substantially transversely across said port and withdrawn from the extended position;
   a transverse movement means to effect such extension and withdrawal of the reference surface, the transverse movement means being operable from a position external of the lens port; and
   a translational movement means to move the reference surface in a direction substantially parallel to the longitudinal axis, the translational movement means being operable from a position external of the lens port.

2. The positioning device as claimed in claim 1, wherein the reference surface comprises or includes a reference to allow the white balance of a photographic device to be set.

3. The positioning device as claimed in claim 1, wherein the transverse movement means and the translational movement means are able to be operated by a single control member positioned external of the lens port.

4. The positioning device as claimed in claim 1, wherein the reference surface comprises a plurality of pivotally mounted blades, the blades being rotatable about the pivot point so as to be extendable or retractable transversely of the longitudinal axis.

5. The positioning device as claimed in claim 4, wherein the blades are mounted in a first ring member, the first ring member being movable to effect translational movement of the reference surface.

6. The positioning device as claimed in claim 5, wherein a second ring member is provided within the port, and the control member includes a shaft passing through the port, and operation of the shaft causes rotational movement of the second ring within the port.

7. The positioning device as claimed in claim 6, wherein the second ring has slots therein, and the first ring has pins thereon positioned within the slots in the second ring, the slots being shaped such that rotational movement of the second ring with respect to the first ring causes translational movement of the second ring during a first operation of the control member.

8. The positioning device as claimed in claim 7, wherein the slots are further shaped so that further rotational movement of the second ring with respect to the first ring causes rotational movement of the second ring to cause the reference surface to extend across the port during a further operation of the control member.

9. The positioning device as claimed in claim 8, wherein rotation of the control member causes the second ring to rotate with respect to the first ring.

10. A camera including therewith a positioning device as claimed in claim 1.

11. The camera as claimed in claim 10, wherein the camera is an underwater camera and/or a camera in an underwater camera housing.

12. A positioning device for a reference surface within a lens port having a longitudinal axis, comprising:
 a reference surface means able to be extended substantially transversely across said port and withdrawn from the extended position; and
 a transverse movement means to effect such extension and withdrawal of the reference surface, the transverse movement means being operable from a position external of the lens port,
 wherein the reference surface comprises a plurality of pivotally mounted blades, the blades being rotatable about the pivot point so as to be extendable or retractable transversely of the longitudinal axis.

13. The positioning device as claimed in claim 12, wherein the blades are mounted in a first ring member, the first ring member being movable to effect translational movement of the reference surface.

14. The positioning device as claimed in claim 13, wherein a second ring member is provided within the port, and the control member includes a shaft passing through the port, and operation of the shaft causes rotational movement of the second ring within the port.

15. The positioning device as claimed in claim 14, wherein the second ring has slots therein, and the first ring has pins thereon positioned within the slots in the second ring, the slots being shaped such that rotational movement of the second ring with respect to the first ring causes translational movement of the second ring during a first operation of the control member.

16. The positioning device as claimed in claim 15, wherein the slots are further shaped so that further rotational movement of the second ring with respect to the first ring causes rotational movement of the second ring to cause the reference surface to extend across the port during a further operation of the control member.

17. The positioning device as claimed in claim 16, wherein rotation of the control member causes the second ring to rotate with respect to the first ring.

\* \* \* \* \*